(12) United States Patent
Pachet

(10) Patent No.: US 6,794,566 B2
(45) Date of Patent: Sep. 21, 2004

(54) INFORMATION TYPE IDENTIFICATION METHOD AND APPARATUS, E.G. FOR MUSIC FILE NAME CONTENT IDENTIFICATION

(75) Inventor: François Pachet, Paris (FR)

(73) Assignee: Sony France S.A., Clichy la Garenne (FR)

( * ) Notice: Subject to any disclaimer, the term of this patent is extended or adjusted under 35 U.S.C. 154(b) by 98 days.

(21) Appl. No.: 10/131,459

(22) Filed: Apr. 23, 2002

(65) Prior Publication Data

US 2002/0189427 A1 Dec. 19, 2002

(30) Foreign Application Priority Data

Apr. 25, 2001 (EP) ............................................. 01401064

(51) Int. Cl.⁷ .............................................. G06F 17/30
(52) U.S. Cl. ............................... 84/600; 84/645; 705/1; 709/6
(58) Field of Search ........................... 84/600–602, 645; 705/1; 707/6

(56) References Cited

U.S. PATENT DOCUMENTS

| | | | |
|---|---|---|---|
| 5,616,876 A | | 4/1997 | Cluts |
| 6,345,256 B1 | * | 2/2002 | Milsted et al. .................. 705/1 |
| 6,389,467 B1 | * | 5/2002 | Eyal ........................... 709/223 |

OTHER PUBLICATIONS

Anquetil N et al.: "Extracting Concepts From File Names; A New File Clustering Criterion" Software Engineering, 1998. Proceedings of the 1998 International Conference on Kyoto, Japan Apr. 19–25, 1998, Los Alamitos, CA, USA, IEEE Comput. Soc, US, Apr. 19, 1998, pp. 84–93, XP010276065.

* cited by examiner

*Primary Examiner*—Marlon T. Fletcher
*Assistant Examiner*—David S. Warren
(74) *Attorney, Agent, or Firm*—Frommer Lawrence & Haug LLP; William S. Frommer; Hans R. Mahr

(57) ABSTRACT

The method serves to automatically identify in a set of data sequences at least one specific type of information contained in each data sequence of the set, wherein the type of information has an unknown presentation in the data sequences. It comprises the steps of:

- initially defining at least one characteristic feature of the specific type of information, and of expressing the characteristic feature(s) in terms of at least one recognition rule executable by processor means (2),
- applying the recognition rule(s) through the processor means to analyze the set of data sequences,
- determining in each data sequence a data portion thereof satisfying the recognition rule(s), and
- identifying the data portion as corresponding to the specific type of information.

The invention can be used notably for automatically processing the contents of music file names, where the data sequence corresponds to the characters for a music file, and the specific information types are an artist name and/or music title contained in some arbitrary form and order in the file name.

32 Claims, 4 Drawing Sheets

INFORMATION TYPE IDENTIFICATION METHOD AND APPARATUS, E.G. FOR MUSIC FILE NAME CONTENT IDENTIFICATION

The present invention relates to a method and apparatus for automatically identifying at least one specific type of information contained in a data sequence. The data sequence can correspond e.g. to the characters forming a file name attributed to a music file or other form of computer file. In the case of a music file (sometimes also known as an audio file), the specific type of information in question can be an artist name and/or a music title contained in the character sequence forming the file name.

Such an automatic information identification can be used for managing large sets of music files located on personal storage medium, such as hard disks, CD roms DVD roms, minidisks, etc.). The information thus extracted can be used in various applications in areas of sorting, archiving, computer assisted music title compilation and playlist generation, etc.

A music file is generally a data module containing binary data that encodes recorded music corresponding to a music title. The data can be read from the file and processed to produce an audio output exploitable by a computer or suitable sound reproduction system. Music files are generally handled and managed like other computer files, and have arbitrarily chosen file names which serve to indicate the associated audio content, usually a music title and artist. For instance the file name can be made to indicate the artist and the song or album corresponding to the audio contents. The audio file will typically also have an extension (part appearing just after a dot) indicating the music format, normally a compression protocol such as mp3, wav, or the like. File names can be given by music distributors, or by end users who create their own audio files.

There is nowadays a rapidly growing number of users who create and store vast collections of such audio files (over one thousand) on personal storage medium, typically computer hard disks and writable CDs. The music files of a collection can have different origins: personal CD collections, files downloaded from internet sites, such as those which sell music titles online, CDDB, radio recordings, etc.

At present, there is no standardised format for naming files, either in terms of syntax or in terms of artist name and title. In particular, users are normally confronted with disparate titling formats in which the order and form of the identification information can vary from one title to another. This lack of uniformity is clearly apparent when consulting lists of audio files presented at random from different users, e.g. in the internet sites which sell music titles online.

Some recording formats such as mp3 include so-called metadata which serves to identify the artist and title, but again no set rule is established stating how that information is to be organised. Likewise, there is no universal coding system for artist names or songs or track titles. For example, the pop group "The Beatles" will appear in some catalogues under "Beatles", while in others under "The Beatles", or again "Beatles, The". Similarly, the lack of universal coding of music title file names is also a source of problem, especially when dealing with lengthy and complex title names. In particular, there is no rule regarding the order of mention of the artist and music title in a file name.

There then arises a problem of distinguishing the artist from the music title contained in a music file name, starting from the fact that the file name can be expected to contain that information in some form, possibly with abbreviations.

This distinguishing task is normally easy for a human being, whose cognitive and thinking processes are well suited to such recognition and sorting tasks. Nevertheless, it quickly become tedious when having to manage vast collections of audio files e.g. of over a thousand titles and possibly much more.

Moreover, a manual identification does not in itself allow the useful information to be passed on to a music title management system without some additional human intervention. Such a manual approach would thus defeat the object of creating a fully automated and flexible system.

In view of the foregoing, a first object of the invention is to provide a method of automatically identifying in a set of data sequences at least one specific type of information contained in each data sequence of the set, wherein the type of information has an unknown presentation in the data sequences, characterised in that it comprises the steps of:

initially defining at least one characteristic feature of the specific type of information, and of expressing the characteristic feature(s) in terms of at least one recognition rule executable by processor means, applying the recognition rule(s) through the processor means to analyse the set of data sequences, determining in each data sequence a data portion thereof satisfying the recognition rule(s), and identifying the data portion as corresponding to the specific type of information.

It can be appreciated that the invention effectively forms an automated means for extracting items of information from a source in which those items are not expressed in a rigorous manner, or are presented in a manner which is not known a priori at the level of means performing the automatic identification. In this respect, the invention can be seen as a means for extracting features or rules from a system of information where those features or rules are not identified or labelled by that system.

Thus, in the context of names attributed to music files, the invention makes it possible to recognise automatically an artist name and a music title when these items of information are not expressed in the filename with rigour or according to a universal protocol.

The determining step can comprise a sub-step of picking out from the data sequence different data portions corresponding to respective types of information and applying the recognition rule(s) on each the picked out data portion.

One recognition rule can instruct to identify the specific type of information in terms of frequency of occurrence of a data portion over the set of data sequences.

Thus, the determining step further comprises the sub-steps of:

determining relative positions of the different data portions within a data sequence, comparing, over the set of data sequences, data portions occupying the same relative position in the data sequence, and determining from the comparison the relative position where there is the greatest occurrence of identical data portions over the set of data sequences, and wherein the step then involves identifying the data portion located at the relative position of greatest occurrence as corresponding to the specific type of information.

Another recognition rule can instruct to identify the specific type of information type in terms of the size of a data portion of the data sequence, and/or instruct to identify the type of information type in terms of a relative position of a data portion in the data sequence.

The determining step can comprise the following substeps, applied to at least some of the data sequences of the set:

determining a candidate data portion in a data sequence, and comparing the candidate data portion against a stored set of data portions known to correspond to the specific type of information to be identified, wherein the identifying step involves identifying the data portion found to be present in the data base as corresponding to the specific type of information.

There can be provided a step, prior to the determining step, of normalising the data sequence by removing from the data sequence data not susceptible of being contained in the specific type of information to be identified.

There can also be provided a step, prior to the determining step, of identifying in the data sequence separator data separating different data portions therein, by reference to a stored set of possible separator characters.

The data sequence corresponds to characters forming a file name of a computer file.

In the embodiment, the set of data sequences corresponds to a respective set of file names of music files, each data sequence being the characters forming a corresponding music file name, and a data portion being a character field containing information of a given type, and the specific type of information to be identified comprises at least one of:

a first type of information corresponding to an artist name contained in the music file name, and a second type of information corresponding to a music title name contained in the music file name.

In this case, the method can further comprise a step, prior to the determining step, of determining a separator character present between character fields respectively assigned to the first and second types of information.

Preferably, the separator character is inferred as being: i) neither a digit, nor a letter, nor a space, and ii) present the same number of times in all file names excluding starting and ending positions.

There can be provided a further step of detecting the presence of a character cluster composed of a first part which is constant and a second part which is variable over the set of music file names, the second part being e.g. an integer or equivalent count character, and of eliminating that character cluster from the character sequence.

A recognition rule in the context of music files can instruct to identify the first type of information as contained in the character field forming the most words among character fields assigned to respective types of information, and/or as contained in the character field which has the most occurrence in identical form in the set of music file names, and/or as contained in the character field matching a character field in a set of stored character fields corresponding artist names, and/or as contained in the first character field appearing in the music file name.

The determining and identifying steps can involve the sub-steps of:

identifying in the characters forming the music file name a first character field and a second character field, one the field containing the first type of information (artist name) and the other containing the second type of information (music title name), determining, by reference to an artist database containing character, fields each corresponding to a respective artist name, a first value corresponding to the number of occurrences, over the set of music file names, of a first character field contained in the artist database, and a second value corresponding to the number of occurrences, over the set of music file names, of a second character field contained in the artist database, wherein if the first value is greater than the second value, identifying the first character field as corresponding to an artist name, if the second value is greater than the second value, identifying the second character field as corresponding to an artist name, if the first and second values are equal, continuing by:

determining a new first value corresponding to the number of different contents of the first character field over the set of music file names and a new second value corresponding to the number of different contents of the second character field over the set music file names, wherein if the first value is greater than the second value, identifying the second character field as corresponding to an artist name, if the second value is greater than the second value, identifying the first character field as corresponding to an artist name, if the first and second values are equal, continuing by:

determining a new first value corresponding to the total number of words in the first character field summed over the entire set of music file names and a new second value corresponding to the total number of words in the second character field summed over the entire set of music file names, wherein if the first value is greater than the second value, identifying the first character field as corresponding to an artist name, if the second value is greater than the second value, identifying the second character field as corresponding to an artist name, and if the first and second values are equal, identifying the first character field as corresponding to an artist name.

There can further be comprised the step of applying rewriting rules to at least one of an artist name and a music title name identified from a music file name, the rewriting rules being executable by the processor means for transforming an artist name/music title name into a form corresponding to that used for storing artist names/music title names in a database.

The method may also comprise a step of compiling a directory of rewritten music file names, corresponding to the identified music file names, in which at least one of an artist name and a music title name is organised to be machine readable.

It may further comprise the step of constructing for each music file name a machine readable information module comprising at least an identified artist name and an identified music title name, to which is associated metadata, the metadata being provided from a database on the basis of the identified artist name and/or music title name.

The metadata can be indicative of a genre or genre/subgenre associated with the corresponding music title.

A second object of the invention concerns the use of the above method in a music playlist generator, wherein the playlist generator accesses stored music files by reference to identified artist names and/or identified music title names.

A third object of the invention concerns an apparatus for automatically identifying in a set of data sequences at least one specific type of information contained in each data sequence of the set, wherein the type of information has an unknown presentation in the data sequences, characterised in that it comprises the steps of:

means for expressing at least one characteristic feature of the specific type of information, and for expressing the characteristic feature(s) in terms of at least one machine executable recognition rule, processor means for applying the recognition rule(s) to analyse the set of data sequences, determining means for determining in each data sequence a data portion thereof satisfying the recognition rule(s), and identifying means for identifying the data portion as corresponding to the specific type of information.

The optional aspect of the method defined above apply mutatis mutandis to that apparatus.

A fourth object of the invention concerns a system combining the above apparatus with a music playlist generator, wherein the playlist generator accesses stored music files by reference to identified artist names and/or identified music title names.

The invention can thus provide automated means for identifying items of information expressed in file names—or more generally in a data sequence—e.g. to pick out an artist name and/or music title from a music file name organised in one of different possible ways. These means can be used in conjunction with automated systems that manage large numbers of audio files for creating music programs, compiling playlists, intelligently sorting, archiving, etc. In this way, the means of the invention form an interface between a collection of files named in a random manner and an intelligent file management system which requires precisely presented identification information.

In this context, the invention can find applications in a comprehensive management system providing the following functionalities: 1) automatic recognition of title and artist identifiers from music file names, 2) automatic classification of music titles using external sources of metadata (e.g. genre/subgenre), 3) mechanisms for handling all possible listening situations/behaviours ranging from focussed (e.g. subgenre) to open/exploratory modes, and 4) a facility for exchanging user-specific categories through global servers or peer-to-peer communications systems.

The invention has applications in end user software for PC, Interactive Digital Television (IDTV) via set-top boxes or integrated TVs, internet music servers, and Electronic Music Delivery services in general.

The invention and its advantages shall be more clearly understood upon reading the following detailed description of detailed embodiments, given purely as non-limiting examples, in conjunction with the appended drawings, in which.

Figure 1:
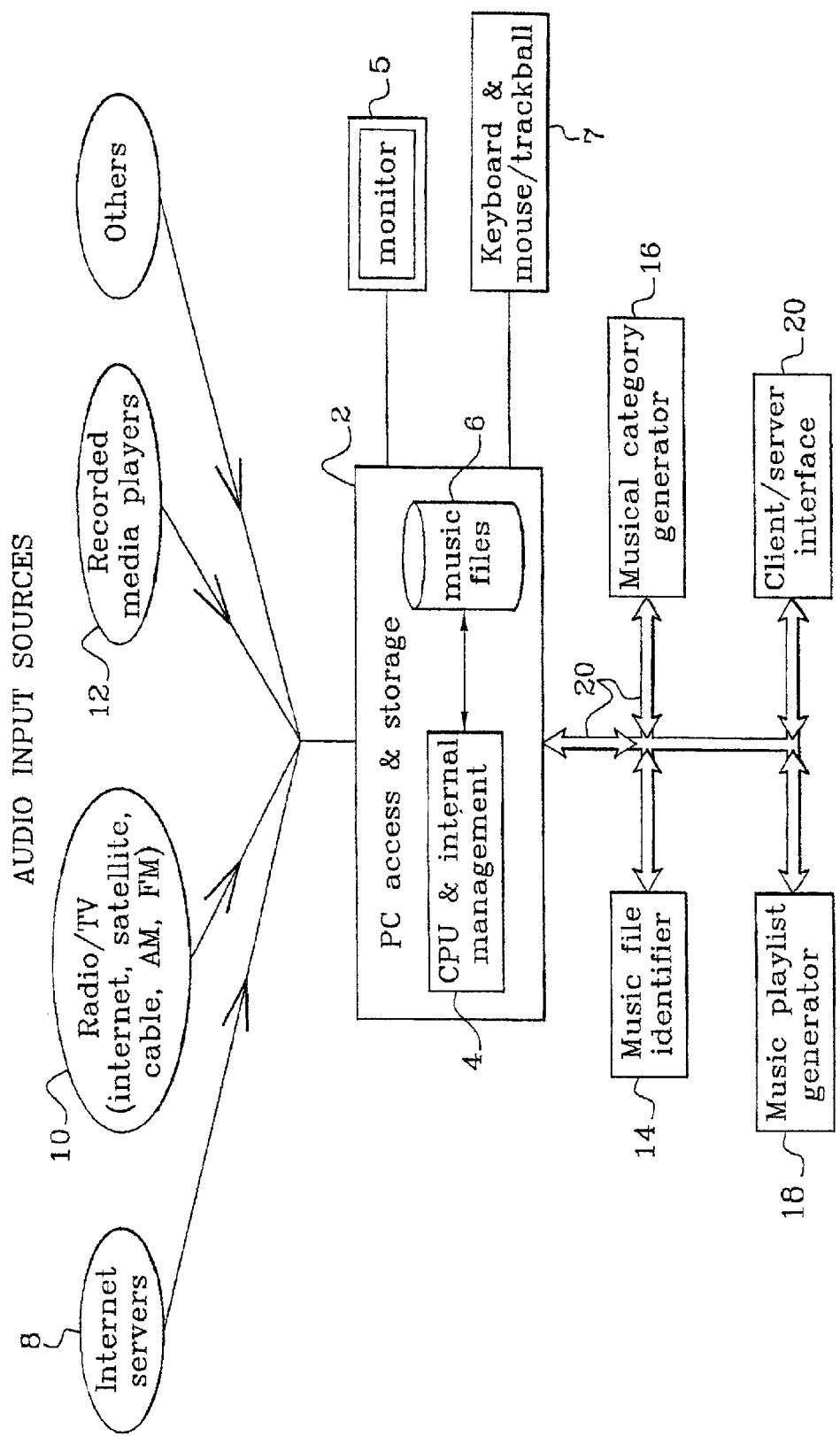
FIG. 1 is a simplified block diagram showing a possible application of an information identification device in accordance with the invention in the context of music title and artist name extraction from music file name data.

FIG. 1 shows a typical system in which the invention can be integrated. The system 1 in this example is centred around a personal computer (PC) 2 which is here decomposed in terms of a CPU (central processing unit) and internal management section 4, and one or more hard disk(s) 6 containing music files. Interfacing with the user is through a normal computer video monitor 5 and a keyboard with an associated screen pointing and selecting device such as a mouse or trackball 7. The music files are loaded and accessed by the internal management section 4 using standard techniques. These files are acquired from different possible audio input sources to which the PC can be connected. In the example, these include:

internet servers 8 such as sites which sell music titles online, which generally allow music files to be downloaded complete with the file name attributed by the provider. To this end, the PC access and storage unit 2 is equipped with a modem or other suitable interface and the appropriate internet software to establish the connections required;

broadcast music from radio or TV stations 10. The stations in question can be internet radio, cable, satellite, AM or FM stations; and recorded media players 12, such as compact disk or tape players, for transferring pre-recorded music into the hard disk 6.

With the last two sources 10, 12, the music is generally not presented in the form of a music file (except in the case of a CD rom or the like). The recorded sound is thus processed by appropriate software within the PC 2 in accordance with a given compression protocol (mp3, wav, etc.) and given a file name by the user prior to storing in the hard disk(s) 6.

Operating in conjunction with the PC access and storage unit 2 are four functionally separated modules:

a music file identifier 14, which constitutes an embodiment of the invention. Its main task in this example is to identify and reformat automatically both the artist name and the title name contained in a given music file name;

a musical category generator 16, which is a software tool for sorting and cataloguing musical items in terms of genres and/or sub-genres, or other criteria. These are either already contained in the form of metadata incorporated in a music file, or entered manually by the system user;

a music playlist generator 18, which is a tool for building playlists, i.e. ordered sequences of musical items, on the basis of users' tastes, statistical analyses on previously recorded sequences, and a host of other selection criteria. An example of such a music playlist generator is described in copending European patent application EP 00 403 556.4 by the present Applicant. Basically, the music playlist generator 18 exploits information analysed in the musical category generator 16 to produce music programs, i.e. sequences of music titles, based on:

the user profile similarity relations the degree of novelty desired.

For a detailed description of that particular music playlist generation system, reference can be made to European Patent Application No.00 403 556.4, filed on Dec. 15, 2000, and a client/server interface 20, which functionally links all the elements 2–18 mentioned above to provide the user with an integrated set of inputs and outputs through an interactive software interface. The latter appears in the form of menu pages and icons with on-screen push-buttons and cursors displayed on the monitor 5.

All the components of system 1 are interconnected for exchanging commands and data through a shared two-way communications system 22. Depending on the implementation of the apparatus 1, the communications system. 22 can be a physical bus linking the different component units 2–20, or more generally a data exchange protocol in a software based configuration. In a typical embodiment, the music file identifier 14, musical category generator 16, music playlist 18, and client/server interface 20 are in the form of software or firmware modules incorporated within a PC or in one or several boxes connected to the latter.

The remainder of the description shall focus on the music file identifier 14, the other components being known in themselves and outside the core of the present invention.

The task of the music file identifier 14 is to help build a database of music titles automatically from a set of files randomly located on a personal storage system, such as the hard disk(s) 6. The database in question comprises identification information related to a set of music files located on the storage medium.

Music files of various types may be present on the medium (e.g. wav, mp3, Atrac3, etc.). The main task in this context is to assign an artist and title identification to each of these files.

This task involves on the one hand obtaining the basic artist/name identification from the file name and on the other unambiguously identifying the artist and title information (i.e. coping with ambiguities, typos and errors in general).

The complexity of the task of interpreting various syntaxes shall be illustrated by examples of possible file names for the music title from The Beatles entitled "Eleanor Rigby" (from the album "Revolver"):

The Beatles—Eleanor Rigby.mp3 eleanor rigby; the beatles.mp3

The Beatles—Revolver—Eleanor Rigby.MP3

The Beatles—Eleanor Rigby—Revolver—Track 2.mp3

Eleanor Rigby—Beatles, The.mp3

Eleanor Rigby—Beatles, The.mp3 etc.

In the simplest case, these two items of information (artist name and title name) are located in the audio file itself, for instance through so-called "ID tags" in an mp3 file. However, ID tags are not standardised and in many instances music files do not contain this information. The only way to obtain it therefore is through an analysis of actual file names. Moreover, even when ID tags are not empty, they may contain errors or ambiguities.

The main problem to solve in this case is to guess the syntax of the file name so as to extract therefrom the artist and name information, whenever possible.

To this end, the Applicant conducted a large-scale analysis of existing music file names (on individual hard disks, playlists, and databases such as CDDB), and determined a set of heuristic rules through which the required information could be inferred. From these heuristic rules can be developed machine interpretable recognition rules for implementing the identification task.

Because music files are usually grouped in directory structures on storage systems, the problem was reduced to identifying sets of related music files rather than individual files. Considering sets of files as opposed to individual files allows to deduce automatically valuable information on the file name syntax.

This set of heuristic rules can be turned into a process which takes as input:
a set of music file names, typically corresponding to music files in a given directory or subdirectory structure, or to a CD playlist, e.g. as returned by the CDDB server,
a database of existing artist and titles. This database is typically located at an internet server. It can be partially present, i.e. only a database of artist names, or even totally absent, and yields as output:
for each file name, the most probable artist and title information, and (possibly)
an update of the artist and title database.

Figure 2:
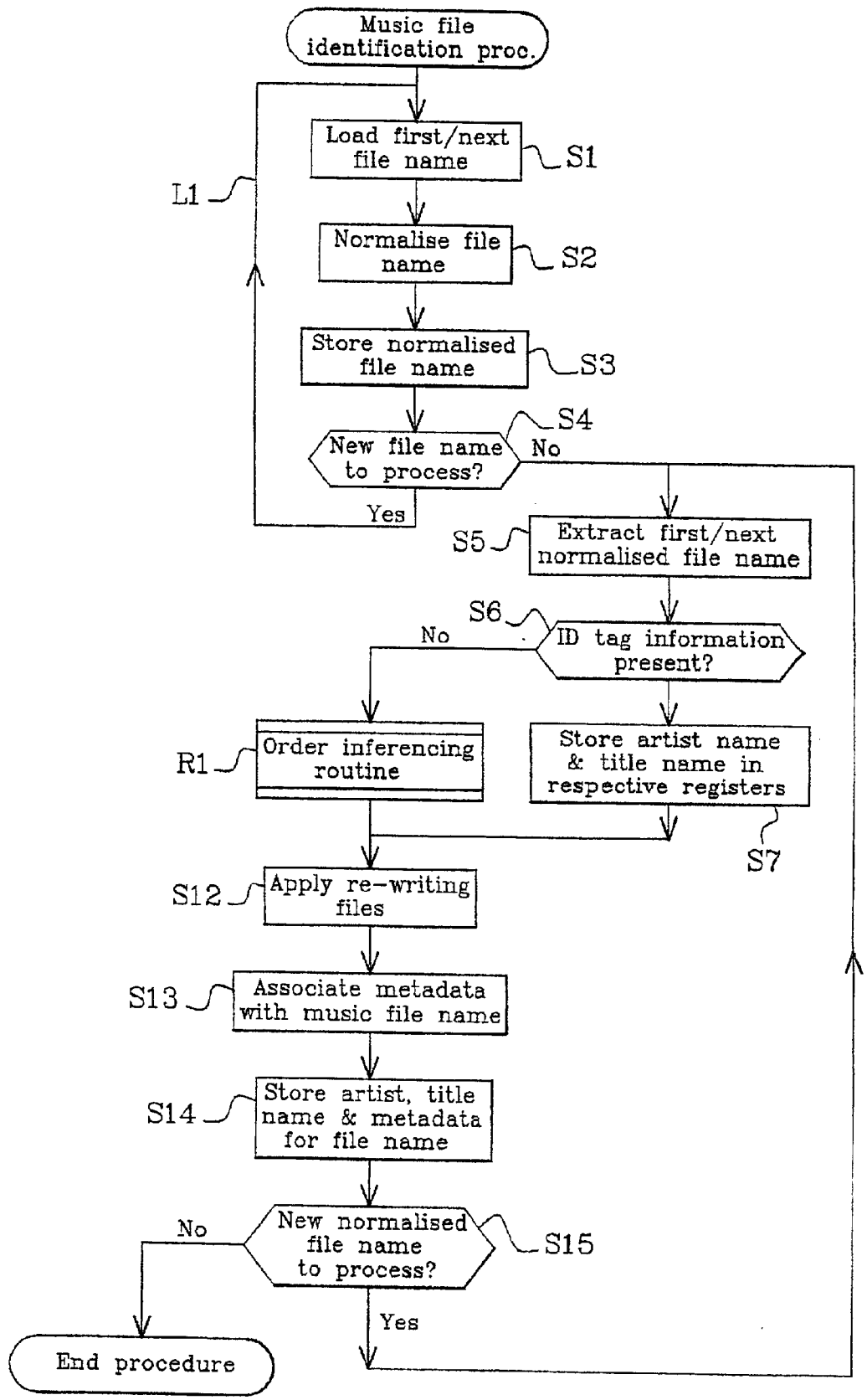
FIG. 2 is a general flowchart showing a procedure used by the information identification device of FIG. 1 to produce normalised formats of music title and artist names from music file name data.
Figure 3:
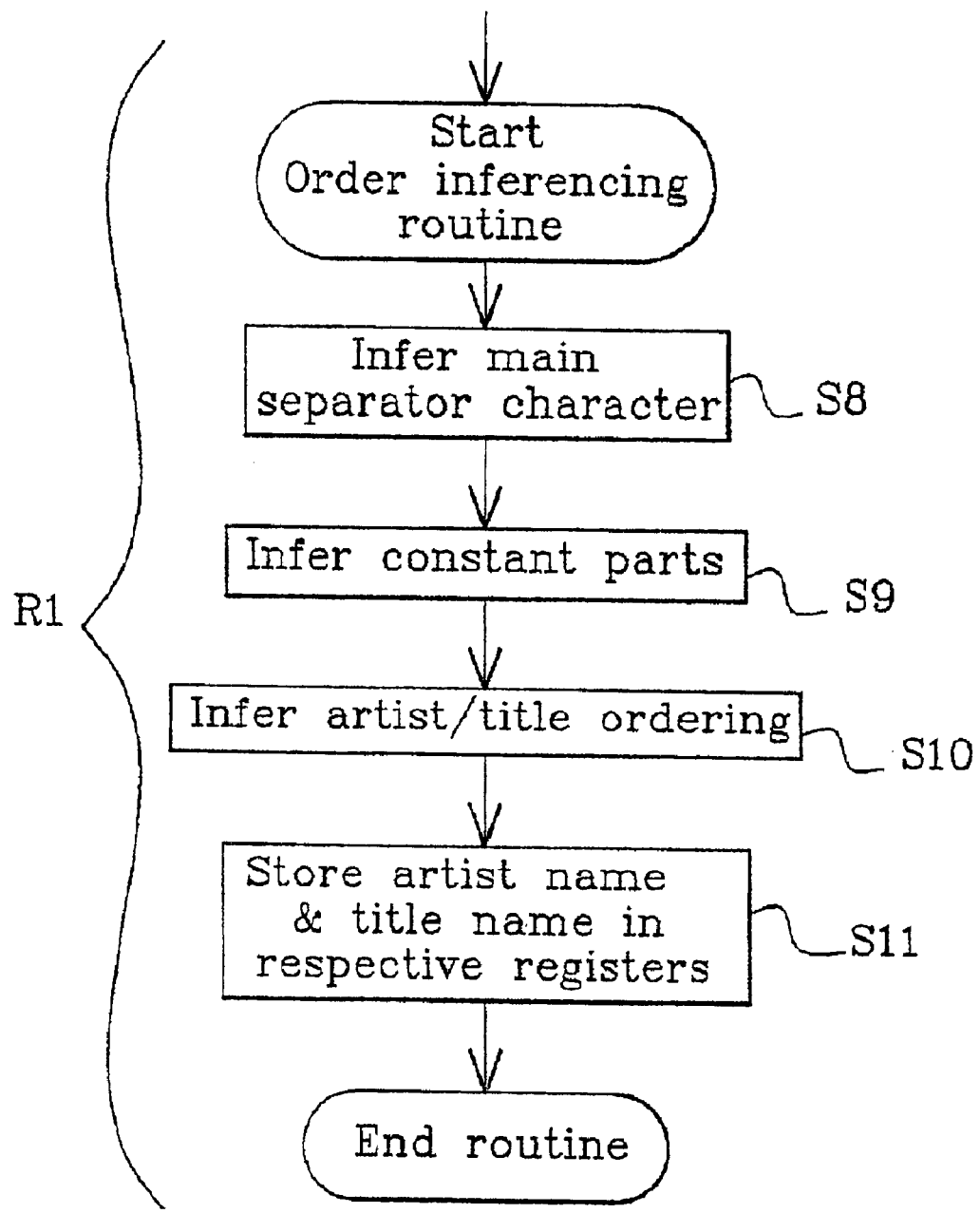
FIG. 3 is a flowchart of an inferencing routine used in the procedure of FIG. 2.

In the preferred embodiment, the process involves executing a sequence of tasks—indicated below by respective numbered paragraphs—which take the form of modules. These shall be described with reference to the flow charts of FIGS. 2 and 3.

The process begins by loading a file name into the music file identifier 14 (step S1). In the course of the process, a number of file names—preferably as many as possible—shall be processed. As shall appear further, these file names are treated both sequentially and collectively. Collective processing is used when dealing with samples for statistical analysis, e.g. for inferring artist and title name ordering (cf FIG. 3). For optimising collective processing, the files considered shall preferably be extracted from a common source a same pre-recorded medium (e.g. a CD), a same collection, and more generally from a same directory of the hard disk(s) 6 insofar as it can be assumed that the division into directories reflects some commonness in the audio file name attribution.

Task Module 1): Normalise the File Name (step S2).

This involves setting the file name into a standardised typographical form in preparation for the subsequent task modules. The normalisation does not in itself alter or extract data from the file name.

In the example, file name standardisation involves performing the following tasks:

1.1.—remove trimming spaces, i.e. blank characters which may be present at the start and /or end of a string of characters 1.2.—convert to upper case 1.3.—remove all non digit, non letter and non separator characters, and replace by "_".

For instance, by applying rules 1.1 to 1.3, a file name such as "Eleanor Rigby—The Beatles—Revolver@track 3.mp3 " would become "ELEANOR RIGBY—THE BEATLES—REVOLVER_ TRACK3.MP3".

Once the file name has been normalised, it is stored in a normalised name memory for future reference during the course of the procedure (step S3).

The process then continues by seeking whether a new file name is to be processed as above (step S4). It thus follows a return loop (L1) back to step S1 until all the file names forming a set to be considered have been normalised and stored. These normalised file names thus obtained are stored in the normalised memory for future reference.

There is then extracted from the normalised name memory the first normalised file name (step S5) for processing by the next task module 2) below.

Task Module 2): Check if the Artist and Name Information are Located in an ID Tag in the Corresponding Music File Itself (step S6).

This task serves to determine whether it is necessary to infer the artist and title names from the file name. This is clearly unnecessary if that information is readily obtainable at the level of the ID tag contained as metadata in the music file.

If the information is obtainable from the ID tag, the process moves to a step S7 of extracting the artist and title names from the ID tag and of storing them in corresponding memory registers for subsequent reference.

Otherwise (ID tag not present), the process moves from step S6 to an inferencing routine R1 (task module 3).

Task module 3): Order Inferencing Routine (R1).

This task is executed when there is no ID tag to exploit. It comprises a self-contained routine comprising a series of steps indicated in FIG. 3. The routine rests on the assumption that although the syntax of the file names is unknown (for instance it can be ordered in terms of artist followed by title name, or title name followed by artist, or other), it is going to be the same for all files in the directory. The subtasks of the order inferencing are:

3.1. Infer the Main Separator Character (step S8).

The separator character can be for instance "-", "_", or ",", or any character belonging to a list of separator characters established to that effect, designated SEPARATOR_SET and stored in an appropriate memory location. The latter is a set of all known separator characters susceptible of being used in a file name.

The inference is performed by computing the intersection of all characters for all files analysed, and retaining only those characters which are:

neither digits, nor letters, nor spaces, present the same number of times in all file names excluding starting and ending positions.

To this end, inferencing step S8 involves analysing some, or preferably all, of the normalised file names stored at step S3: the larger the sample, the more the inferencing is reliable.

For instance, in the case of "ELEANOR RIGBY—THE BEATLES—REVOLVER_TRACK3.MP3", the separator would be "-", provided it is confirmed that this separator character is present for all files in the considered set of normalised file names.

3.2. Infer Constant Parts (step S9).

File names may contain constant parts, usually album names, possibly augmented with track names. This means that each file name may have the form "constant+variable", separated from the rest by a separator. Here, the terms "constant" and "variable" are taken to mean respectively constant throughout all or a determined proportion of the analysed normalised file names and variable from one normalised file name to another.

For instance, the file name "ELEANOR RIGBY—THE BEATLES—REVOLVER_TRACK3.MP3" has a constant part of "REVOLVER_TRACK" followed by an integer variable "3".

The "constant" part of the file name can be identified by standard character string comparison techniques, on the basis that a character string separated by a separator and found to recur among the analysed normalised file names. In the above example, two such constant parts could possibly be identified: "THE BEATLES" and "REVOLVER_TRACK". However, only the latter is followed by the above-mentioned variable. The constant part "REVOLVER_TRACK" is then selected as the one to take into account in that step simply by checking for the presence of a variable character following these two candidate strings.

Once identified, if present, this constant part is removed from the normalised file names together with its following variable (step S9). For instance, the preceding file name would become: "ELEANOR RIGBY—THE BEATLES.MP3". From that point on, it can be assumed that the resulting file names are in one of two forms (excluding the extension):

"artist+separator+title", or

"title+separator+artist".

3.3. Infer Artist/Title Ordering (Step S10)

Here, each title is considered to possess two types of information, designated "column 1" and "column 2". The task is then to infer whether column 1 corresponds to the artist or title name. Knowing which column is the artist, it can be deduced that the other one is the title, and vice versa.

To infer which is the artist column, the processor 2 is made to execute recognition rules, which are algorithms constructed from respective heuristic rules. The heuristic rules are deduced at an initial stage from the general characteristics of the type of information to be identified. In the example where the type of information includes an artist name in a data sequence containing in some undetermined form both the artist and the music title names, the are heuristic rules (HR) used:

HR1: artist names are less numerous than title names. A given artist usually produces more than one title. As a separate consideration, virtually any short sentence can be a title name. Therefore, it is a realistic goal to build a database of all artist names. Such a database can be contained internally within a given memory portion of the system and/or outside the system, e.g. from an online provider or server through an internet/intranet connection.

HR2 artist names are more redundant than title names. For instance, it is frequent that in a given directory, two or more audio files are from the same artist. Applying this heuristic rule thus involves comparing names in column 1 and likewise those appearing in column 2. A repetition of a same name in one of column 1 or column 2 is then taken as an indication that the repeated name could indeed correspond to an artist name, and that the column in which this repetition has occurred is occupied by artist names.

HR3: artist names contain, on average, fewer words than title names. For instance, typical artist names are "Supertramp" or "Rossini" (1 word), or "The Beatles" (2 words), whereas typical title names are "Breakfast in America" (3 words), "The Italian Girl in Algiers" (5 words), "I Wanna Hold Your Hand (5 words), etc. Of course, there are numerous exceptions, i.e. artist names longer than title names. However, the Applicant has discovered that on average, these exceptions are compensated in a given set of files. This heuristic rule can be performed by counting the words contained each of the names appearing in column 1 and column 2 over the set of file names stored at step S3, and deducing that the column for which the number of words is the least contains the artist names (or, by corollary, deducing that the column for which the number of words is the most contains the music title names).

HR4: in most cases, artist names appear before titles.

The inferencing routine can apply some or all of these heuristic rules. Where more than one heuristic rule is applied, a hierarchy can be established, whereby the routine is interrupted as soon as a meaningful result is obtained from one of the rules.

In the example, all four heuristic rules are programmed for execution in the order HR1, HR2, HR3 and HR4. Each of these rules is expressed as a respective recognition rule which directs the processor 2 to execute tasks on the normalised file names. These tasks are aimed at deriving a true/false response to an induced assumption that a designated one of column 1 and column 2 names satisfies the corresponding heuristic rule, i.e. corresponds to an artist name.

For instance, heuristic rule HR3 has a corresponding recognition rule which is implemented by determining through counting tasks whether it is true or false that column 1 names, say, contain more words than column 2 names.

Note that heuristic rule HR4 is a default attribution for which the recognition rule is simply involves the task of forcing a true response for column 1 names.

To implement these heuristic rules HR1 to HR4, the embodiment executes the following sequence of procedures:

Procedure ARTIST_IS_FIRST (COLUMN 1, COLUMN 2) Returns a BOOLEAN:

1) "Look for Known Artists" (Heuristic Rule HR1)

Given an existing database of artists, compute OCC1, the number of occurrences of column 1 names which are in the artist database. Likewise, compute OCC2, the number of occurrences of column 2 names which are in the artist database.

Note: to check that a given string of characters is included in the artist or title database, the procedure does not perform a simple string matching (i.e. character-by-character), because the column 1/column 2 names may be subject to some errors, as mentioned above. Instead, the procedure described below (checking entries in artist or title databases) is used.

If OCC1>0 and (OCC2=0) then return TRUE (i.e. COLUMN1 is ARTIST)

If OCC1=0 and (OCC2>0) then return FALSE (i.e. COLUMN2 is ARTIST)

2) "Look for Repeating Artists" (Heuristic Rule HR2)

Compute OCC1, the number of different items for column 1. Likewise, compute OCC2, the number of different items for column 2.

If OCC1>OCC2 then return FALSE

If OCC2>OCC1 then return TRUE

3) "Look for Average Number of Words" (Heuristic Rule HR3)

Compute OCC1, the total number of words in items of column 1. Likewise, compute OCC2, the total number of words in items of column 2.

If OC1>OCC2 then return TRUE

If OCC2>OCC1 then return FALSE

4) "By Default, Artists are First" (Heuristic Rule HR4) return TRUE

The thus-inferred artist names and music title names are stored in respective registers for future reference in the remainder of the music file identification procedure (step S11).

The order inferencing routine R1 is then terminated.

Once these heuristic rules have been applied, there is then performed the task of checking artist and title names written in the respective registers against entries in a database. This database can be the one used in heuristic rule HR1 for the artist name, coupled to a similar data base of music title names, also accessed from the internal memory or through a provider via internet/intranet.

This task allows, among other things, to check for possible mistakes, typos and errors in general in artist or character strings.

To do so, use is made of a separate database containing rewriting rules. These rules are applied systematically to an artist or title information (obtained from the preceding module), and transform that information to yield a "canonical form" (step S12, FIG. 2). It is this canonical form which is checked against the corresponding canonical form of entries in the artist/music title name database.

For artist names, the artist rewriting rules (ARR) are the following:

ARR1: name, The→The name (i.e. definite pronoun placed before the name, and intervening comma removed).

ARR2: name, Les→Les name (for French groups)

ARR3: name, firstname→firstname name, where firstname belongs to a FIRSTNAME_DATABASE. The latter is simply a stored list of possible first names against which the variable "firstname" is checked.

ARR4: Name1 (name2)→name1 (i.e. any reference placed in parentheses after Name 1 is removed. For example, "Yesterday (stereo version)" would become "Yesterday", likewise "Yesterday (mono mix)", would become "Yesterday", etc.)

ARR5: Any space character is removed.

ARR6: All accentuated characters are replaced by their non accentuated equivalents (e.g. é" is replaced by "e").

Other rewriting rules can be envisaged, e.g. to process in different titles in different languages.

By applying these rules, the following examples of transformations are produced: "BEATLES, THE"→"THEBEATLES"; "FRANçOISE HARDY"→"FRANCOISEHARDY".

For titles, the title rewriting rules (TRR) are the following:

TRR1: Name1 (name2)→name1

Once the names have been rewritten according to a standardised format, a spell check is made on the thus-determined artist name. This check involves comparing the characters that form the detected artist name against a database list of known, correctly spelt artist names, and checking for a match. In the case where no match is found, a routine is initiated to determine if the checked name is not similar in form to an artist name in the data base, e.g. whether a double letter has been omitted, a character inversion has occurred, or if a syllable has been incorrectly spelt. If such is the case, then the correctly spelt artist name is automatically inserted in place of the incorrectly spelt name. The techniques for identifying such possible typos and automatically finding and replacing with the appropriate word or name is well known in the field of spelling checkers for word processing software and the like. If no similarity is found by the spell checker, then it is assumed that the artist name is new for the database and that name is simply left as it is.

A similar check can also be made on the music title, using analogous techniques. The corresponding music title data base would normally need to be updated more regularly. However, use can be made of the fact that music titles are normally composed of words which exist individually in spell check dictionaries, especially if the latter also contain proper nouns.

The final output of this module is artist and title information for each file name in a directory.

In the embodiment, the remainder of the procedure is dedicated to the task of preparing the identified and reformatted artist and title name information for future use by the musical category generator 16 or music playlist generator 18.

Once artist and title information is obtained for music files, there is associated to each music file a set of musical metadata (step S13). In general, these metadata can be any descriptor associated to either an artist or a title. They can come from the musical category generator 16, a database (internal or external) or from information contained in the actual music file corresponding to the file name in question.

The complete set of items of information associated to a music file, i.e. the rewritten artist name, rewritten music title name and metadata are stored within or outside the system (step S14) such that they can be later accessed for exploitation by various possible applications, such as the music playlist generator 16.

Once a file name has been processed, the procedure proceeds to check whether another normalised file name is to be processed (step S15). If a new normalised file name it to be processed, the process returns to the step S5 of extracting the next normalised file name and continues from that point on.

Once all the normalised file names have been processed, the procedure branches off from step S15 to its end point.

In a variant where it is not envisaged to associate metadata with a file name, the conditional branching step S15 in view of a possible new file is to be processed is simply implemented just after the step S12 of applying the rewriting rules.

The remainder of the description shall focus on examples of how the extracted and rewritten artist and music title names can be exploited. Here, these items of information are associated with one particularly useful item of metadata: genre/subgenre information. A detailed description of how genre/subgenre information is exploited for the extraction and representation of musical metadata from an audio signal, or for rhythm extraction is given in European patent application EP-A-00 400 948.6, filed on April 6 2000 by the present Applicant.

In the embodiment, the genre category is a simple two-level hierarchical term.

At the first level, there is the field GENRES, such as "Classical", "Jazz", or "Pop". For each genre, there can exist a series of SUBGENRE fields. For instance, the "Jazz" genre may contain subgenres such as "BEBOP", "COOL", "SWING", "BIGBANDS" or even "JAZZ GUITAR", etc.

For each artist, the ARTISTGENRES database contains one or several entries, corresponding to the genre or subgenre the artist usually belongs to. For instance, the database may contain the following entries:

| MARIAH CAREY | POP/POP SONG |
| THE BEATLES | POP/POP SONG |
| JOHN MC LAUGHLIN | JAZZ/GUITAR |
| JOHN MC LAUGHLIN | JAZZ/FUSION |
| RAMEAU | CLASSICAL/BAROQUE |
| ... | .../... | where "/": indicates the genre/subgenre relationship.

Genre and subgenre are very useful items of information when thinking about music. However, genre and subgenre categories are not always objective, and vary from one culture to another. It is therefore proposed to proceed in two steps. First, there is introduced an a priori, initial, genre/subgenre categorisation system, which contains about 10 000 artists. Secondly, users can themselves submit genre/subgenre categories as they wish, using an updating mechanism described below.

At the level of the music playlist generator 18, the rewritten artist names and rewritten music title names extracted automatically by the music file identifier 14 can also be exploited to create intelligent music compilations. More particularly, a playlist compiled will produce an ordered sequence of music titles to be accessed for play on a sound reproduction system or the like. The character format of music title names (and possibly artist names) in the playlist is standardised at the level of the playlist generator's database. The rewritten artist and music title names produced by music file identifier 14 according to the invention have this same format. Accordingly, the system 1 can exploit a playlist produced by the playlist generator 18 directly to access the corresponding music files, the file names of latter having been appropriately rewritten and formatted to correspond to the items of the playlist.

The playlist generator 18 can be made to produce personalised sequences according to music categories (genre/subgenre), and following an analysis of different inputted "seed" playlists, e.g. from radio stations, album compilations, downloaded personal anthologies, etc. This analysis looks not only for a commonness in the genre/subgenre, but also for the closeness of music titles in "seed" playlists, so that if it appears that two different titles are found on several instances to appear close to (or next) each other, the playlist generator shall tend to maintain that neighbourhood relationship in its outputted personalised playlist.

The playlist/music program generator 18 can also be endowed with a controllable "musical excursion" function, which produces occasional departures from an imposed genre or category so as to allow the user to discover other types of music. The excursions nevertheless tend to follow relationships established in the seed playlists, so that a music title corresponding to such an excursion shall be placed near (or next) to a music title within the requested genre or category if the two titles in question have been observed as placed together in one or more seed playlists. The degree of excursion in the personalised playlist is user variable (e.g. through an on-screen slider) from zero discovery to maximum discovery.

The sequences of music title thus produced by the playlist generator can thus be based on:

the user profile, similarity relations, the degree of novelty desired.

The system 1 can thus allow updating of user specific musical information. To allow dynamic updating of title metadata for genre, there is further introduced an updating mechanism. This mechanism simply allows users to "post" genre subgenre information for artists. This allows the user to post and exchange genres dynamically, for instance to create or foster communities with specific music tastes (e.g. hip-hop fans could create a generic hip-hop profile form which interested newcomers could inherit to be able, right away, to create music programs in this style).

Moreover, the system can be extended to include an updating mechanism for TITLE SIMILARITY. This consists simply in allowing users to post their playlists (generated by the system or by any other means). Each playlist posted by a user is then added to the pool of playlists used by a similarity extractor fully described in European patent application EP-A-00 403 556.4 supra from the present Applicant.

Figure 4:
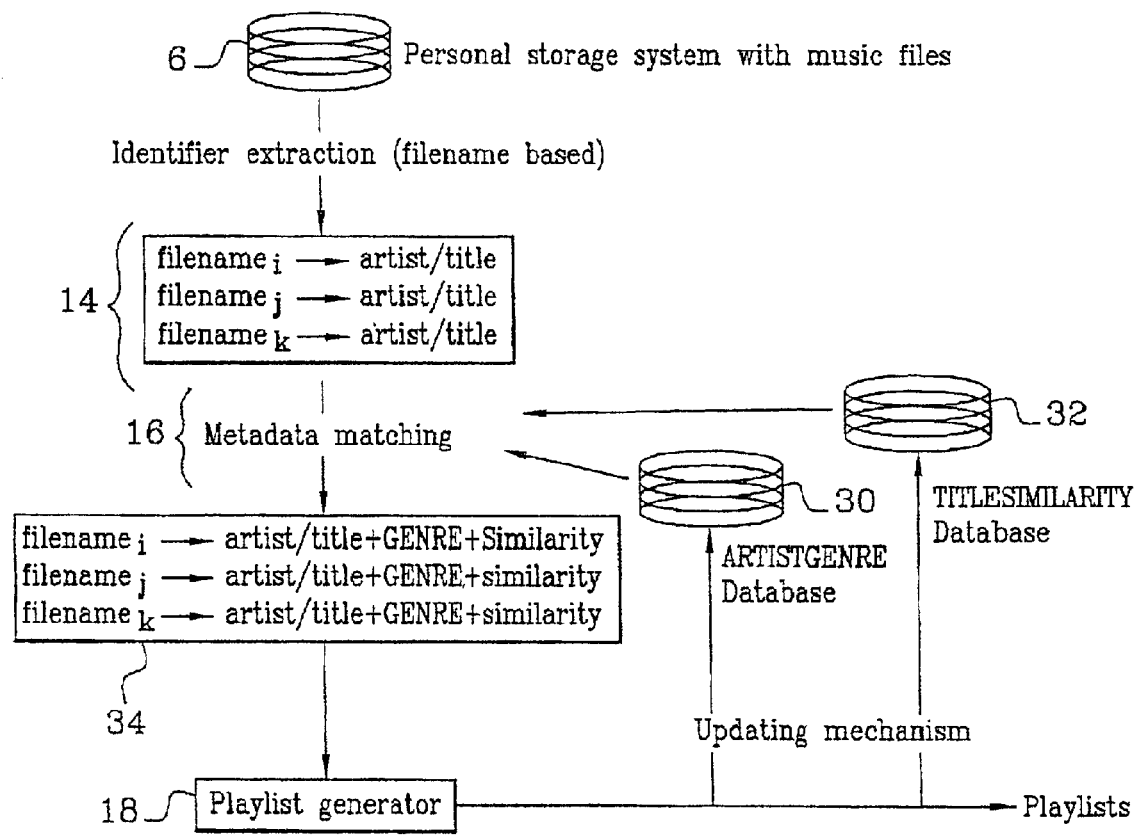
FIG. 4 is a general diagram showing the data flow in the system of FIG. 1.

FIG. 4 illustrates schematically the general organisation of information construction in the system 1 of FIG. 1. The music files stored in the hard disk(s) 6 are accessed for reading their file names by the music file identifier 14. From each accessed filename is obtained the corresponding artist name and title name, using the procedure described above in conjunction with FIGS. 2 and 3.

The artist name and title name information is inputted to the musical category generator 16, where it is matched respectively against an ARTISTGENRE database 30 and a TITLESIMILARITY database 32. From these data bases are extracted the appropriate metadata.

The system 1 then constructs for each processed file name a data module composed of the following information items artist, title, genre, and similarity (box 34).

The resulting data modules are supplied in suitable format to the playlist generator 18 where they serve as a data source for the generation of playlists which can be exported to different units (audio playback systems, servers, etc.).

There is provided a mechanism for updating information from the playlist generator 18 to the ARTISTGENRE database 30 and the TITLESIMILARITY database 32. Thus, a user may add or alter a genre or similarity relationship at the level of the playlist generator and have this action automatically recorded at the level of these data bases 30, 32.

The above are merely examples of applications for tie music file identifier 14 in accordance with the invention. It is clear that the invention has many other possible applications, such as:

- generally reorganising file names automatically in various data bases to make file access amenable to automated protocols and procedures,
- presenting users with a uniform file name presentation (e.g. on screen or printout), to ease viewing and assimilation of contents. For instance, it is much more satisfying to see a list of music titles in a collection of several thousand titles in personal or commercial catalogue listings organised in the same artist/title order, with uniform typography,
- automatically sorting lists of titles, directories, etc.
- automatically ordering missing titles from a server or other source,
- etc.

It will be noted that the rewriting rules established at step S12 are purely arbitrary and established in accordance with the applications with which the music file identifier is to cooperate. Other rules can be envisaged according to circumstances. Thus, rules giving a more presentable format for human intelligibility can be applied for producing on-screen displays or printouts.

Although the embodiments of the invention have been presented in the context of music files, the invention has a much broader spectrum of applications, and covers all situations where items of information are stored in different possible ways and these items need to be extracted automatically. Examples of other areas of application of the invention are:

- managing computer file names, each corresponding to a text, spreadsheet, database file or the like. For instance, a number of persons using a computer system may each have their own way of naming the files they create, but generally in a manner which contains two or more items of information, e.g. among customer name or reference, internal reference, date, etc. A file identifier analogous to that described above can then be implemented to infer the items of information from the different file names so that they can be indexed appropriately in a centralised database;
- managing lists of grouped items of information in general, in which the grouping is not standardised. The lists in question can be referred e.g. to publications with items of information corresponding to author (name and first name), title, editor, or indeed any other inventory,
- etc.

It is clear that there are many different ways of implementing the invention, in terms of both hardware and software. A largely software implementation can be envisaged, with heavy dependency on hardware resources of an existing system, such as the personal computer (PC) of FIG. 1. In this case, the different necessary algorithms would be executed at the level of the PC's CPU 4, with intermediate results stored in the PC's internal memory spaces.

A predominantly hardware implementation of the invention can also be envisaged in the form of a complete stand-alone unit complete with its own processor, memory, interfaces, display, import/output ports, etc.

Between these extremes, other intermediate forms of implementation can be chosen arbitrarily.

What is claimed is:

1. Method of automatically identifying an instance of at least one specific type of information present in a data sequence, wherein said instance is unknown and expressed in one of several different forms in said data sequence, characterised in that it comprises the steps of:
    initially defining at least one characteristic feature of said specific type of information that is independent of said different possible forms of instances thereof,
    expressing said at least one characteristic feature in terms of at least one recognition rule executable by processor means (2),
    applying said at least one recognition rule through said processor means to analyse said data sequence,
    determining in said data sequence a data portion thereof satisfying said at least one recognition rule, and
    identifying said data portion as corresponding to said instance of the specific type of information for that data sequence.

2. Method according to claim 1, wherein said data sequence corresponds to characters forming a file name of a computer file.

3. Method according to claim 1, wherein:
    said data sequence corresponds to a file name of a set of file names of music files, said data sequence being the characters forming a corresponding music file name, and said data portion being a character field containing information of a given type, and
    said specific type of information to be identified comprises at least one of:
    a first type of information corresponding to an artist name contained in said music file name, and
    a second type of information corresponding to a music title name contained in said music file name.

4. Method according to claim 3, further comprising a step, prior to said determining step, of determining a separator character present between character fields respectively assigned to said first and second types of information.

5. Method according to claim 3, further comprising a step of detecting the presence of a character cluster composed of a first part which is constant and a second part which is variable over said set of music file names, said second part being e.g. an integer or equivalent count character, and of eliminating that character cluster from said character sequence.

6. Method according to claim 3, wherein a said recognition rule instructs to identify said first type of information as contained in the character field forming the most words among character fields assigned to respective types of information.

7. Method according to claim 3, wherein a said recognition rule instructs to identify said first type of information as contained in the character field which has the most occurrence in identical form in said set of music file names.

8. Method according to claim 3, wherein a said recognition rule instructs to identify said first type of information as contained in the character field matching a character field in a set of stored character fields corresponding to artist names.

9. Method according to claim 3, wherein a said recognition rule instructs to identify said first type of information as contained in the first character field appearing in the music file name.

10. Method according to claim 3, wherein said determining and identifying steps involve the sub-steps of:
- identifying in said characters forming said music file name a first character field and a second character field, one said field containing the first type of information as artist name and the other containing the second type of information as music title name,
- determining, by reference to an artist database containing character fields each corresponding to a respective artist name, a first value (OCC1) corresponding to the number of occurrences, over said set of music file names, of a first character field contained in said artist database, and a second value (OCC2) corresponding to the number of occurrences, over said set of music file names, of a second character field contained in said artist database, wherein
- if said first value (OCC1) is greater than said second value (OCC2), identifying said first character field as corresponding to an artist name,
- if said second value (OCC2) is greater than said second value (OCC1), identifying said second character field as corresponding to an artist name,
- if said first and second values (OCC1, OCC2) are equal, continuing by:
- determining a new first value (OCC1) corresponding to the number of different contents of said first character field over the set of music file names and a new second value (OCC2) corresponding to the number of different contents of said second character field over the set music file names, wherein
- if said first value (OCC1) is greater than said second value (OCC2), identifying said second character field as corresponding to an artist name,
- if said second value (OCC2) is greater than said second value (OCC1), identifying said first character field as corresponding to an artist name,
- if said first and second values (OCC1, OCC2) are equal, continuing by:
- determining a new first value (OCC1) corresponding to the total number of words in said first character field summed over the entire set of music file names and a new second value (OCC2) corresponding to the total number of words in said second character field summed over the entire set of music file names, wherein
- if said first value (OCC1) is greater than said second value (OCC2), identifying said first character field as corresponding to an artist name,
- if said second value (OCC2) is greater than said second value (OCC1), identifying said second character field as corresponding to an artist name, and
- if said first and second values (OCC1, OCC2) are equal, identifying said first character field as corresponding to an artist name.

11. Method according to claim 3, further comprising the step of applying rewriting rules to at least one of an artist name and a music title name identified from a said music file name, said rewriting rules being executable by said processor means (2) for transforming an artist name/music title name into a form corresponding to that used for storing artist names/music title names in a database.

12. Method according to claim 11, further comprising a step of compiling a directory of rewritten music file names, corresponding to said identified music file names, in which at least one of an artist name and a music title name is organised to be machine readable.

13. Method according to claim 3, further comprising the step of constructing for each music file name a machine readable information module comprising at least of an identified artist name and an identified music title name, to which is associated metadata, said metadata being provided from a database on the basis of said identified artist name and/or music title name.

14. Method according to claim 13, wherein said metadata is indicative of a genre or genre/subgenre associated with the corresponding music title.

15. Use of the method according to claim 3 in a music playlist generator (16), wherein said playlist generator accesses stored music files by reference to identified artist names and/or identified music title names.

16. Apparatus for automatically identifying an instance of at least one specific type of information present in a data sequence, wherein said instance is unknown and expressed in one of several different possible forms in said data sequence, characterised in that it comprises:
- means for expressing at least one characteristic feature of said specific type of information that is independent of said different possible forms of instances thereof,
- means for expressing said at least one characteristic feature in terms of at least one machine executable recognition rule,
- processor means for applying said at least one machine executable recognition rule to analyse said data sequence,
- determining means for determining in said data sequence a data portion thereof satisfying said at least one machine executable recognition rule, and
- identifying means for identifying said data portion as corresponding to said instance of the specific type of information for that data sequence.

17. Apparatus according to claim 16, wherein said data sequence corresponds to characters forming a file name of a computer file.

18. Apparatus according to claim 16, wherein:
- said data sequence corresponds to a file name of a set of file names of music files, said data sequence being the characters forming a corresponding music file name, and a said data portion being a character field containing information of a given type, and
- said specific type of information to be identified comprises at least one of:
- a first type of information corresponding to an artist name contained in said music file name, and
- a second type of information corresponding to a music title name contained in said music file name.

19. Apparatus according to claim 18, further comprising separator character means for detecting a separator character present between character fields respectively assigned to said first and second types of information.

20. Apparatus according to claim 18, further comprising means for detecting the presence of a character cluster composed of a first part which is constant and a second part which is variable over said set of music file names, said second part being e.g. an integer or equivalent count character, and for eliminating that character cluster from said character sequence.

21. Apparatus according to claim 18, wherein a said recognition rule instructs to identify said first type of information as contained in at least one of:
i) the character field forming the most words among character fields assigned to respective types of information, ii) the character field which has the most occurrence in identical form in said set of music file names, iii) the character field matching a character field in a set of stored character fields corresponding artist names, and iv) the first character field appearing in the music file name.

22. Apparatus according to claim 18, further comprising:

means for identifying in said characters forming said music file name a first character field and a second character field, one said field containing the first type of information (artist name) and the other containing the second type of information (music title name), means for determining, by reference to an artist database containing character fields each corresponding to a respective artist name, a first value (OCC1) corresponding to the number of occurrences, over said set of music file names, of a first character field contained in said artist database, and a second value (OCC2) corresponding to the number of occurrences, over said set of music file names, of a second character field contained in said artist database, wherein if said first value (OCC1) is greater than said second value (OCC2), said first character field is identified as corresponding to an artist name, if said second value (OCC2) is greater than said second value (OCC1), said second character field is identified as corresponding to an artist name, means, operative if said first and second values (OCC1, OCC2) are equal, for determining a new first value (OCC1) corresponding to the number of different contents of said first character field over the set of music file names and a new second value (OCC2) corresponding to the number of different contents of said second character field over the set music file names, wherein if said first value (OCC1) is greater than said second value (OCC2), said second character field is identified as corresponding to an artist name, and if said second value (OCC2) is greater than said second value (OCC1), said first character field is identified as corresponding to an artist name, means operative if said first and second values (OCC1, OCC2) are equal, for determining a new first value (OCC1) corresponding to the total number of words in said first character field summed over the entire set of music file names and a new second value (OCC2) corresponding to the total number of words in said second character field summed over the entire set of music file names, wherein if said first value (OCC1) is greater than said second value (OCC2), said first character field as corresponding to an artist name, and if said second value (OCC2) is greater than said second value (OCC1), said second character field as is identified as corresponding to an artist name, and means, operative if said first and second values (OCC1, OCC2) are equal, for identifying said first character field as corresponding to an artist name.

23. Apparatus according to claim 18, further comprising rewriting means for applying rewriting rules to at least one of an artist name and a music title name identified from a said music file name, said rewriting rules being executable for transforming an artist name/music title name into a form corresponding to that used for storing artist names/music title names in a database.

24. Apparatus according to claim 23, further comprising compiling means for compiling a directory of rewritten music file names, corresponding to said identified music file names, in which at least one of an artist name and a music title name is organised to be machine readable.

25. Apparatus according to claim 18, further comprising constructing means for constructing for each music file name a machine readable information module comprising at least of an identified artist name and an identified music title name, to which is associated metadata, said metadata being provided from a database on the basis of said identified artist name and/or music title name.

26. Apparatus according to claim 25, wherein said metadata is indicative of a genre or genre/subgenre associated with the corresponding music title.

27. System combining an apparatus according to claim 16 with a music playlist generator (16), wherein said playlist generator accesses stored music files by reference to identified artist names and/or identified music title names.

28. Method according to claim 1, further comprising:

applying said at least one recognition rule to analyse a set of data sequences including said data sequence;

determining in each data sequence of said set of data sequences a data portion for each data sequence satisfying said at least one recognition rule; and identifying said data portion for each data sequence as corresponding to said specific type of information.

29. Method according to claim 1, wherein said data sequence includes an instance for each of two or more specific types of information, and each instance is expressed in one of several possible forms, the method further comprising:

initially defining at least one characteristic feature of each specific type of information that is independent of said different possible forms of instances thereof, expressing said at least one characteristic feature in terms of said at least one recognition rule, applying said at least one recognition rule through said processor means to analyse said data sequence, determining in said data sequence a data portion for each specific type of information satisfying one or more of said at least one recognition rule, and identifying said data portions as respectively corresponding to said instance of each specific type of information for that data sequence.

30. Method according to claim 3, wherein the order of the types of information in said specific type of information is not known.

31. Apparatus according to claim 16, wherein:

said means for applying said at least one machine executable recognition rule also applies said recognition rule (s) to analyse a set of data sequences including said data sequence;

said determining means also determines in each data sequence a data portion for each data sequence satisfying said at least one machine executable recognition rule; and said identifying means also identifies said data portion for each data sequence as corresponding to said specific type of information.

32. Apparatus according to claim 16, wherein:

said data sequence includes an instance for each of two or more specific types of information, each instance is expressed in one of several possible forms, said means for expressing at least one characteristic feature also expresses at least one characteristic feature of each specific type of information that is independent of said different possible forms of instances thereof, said determining means also determines in said data sequence a data portion for each specific type of information satisfying one or more of said at least one machine executable recognition rule, and said identifying means also identifies said data portions as respectively corresponding to said instance of each specific type of information for that data sequence.

* * * * *